UNITED STATES PATENT OFFICE.

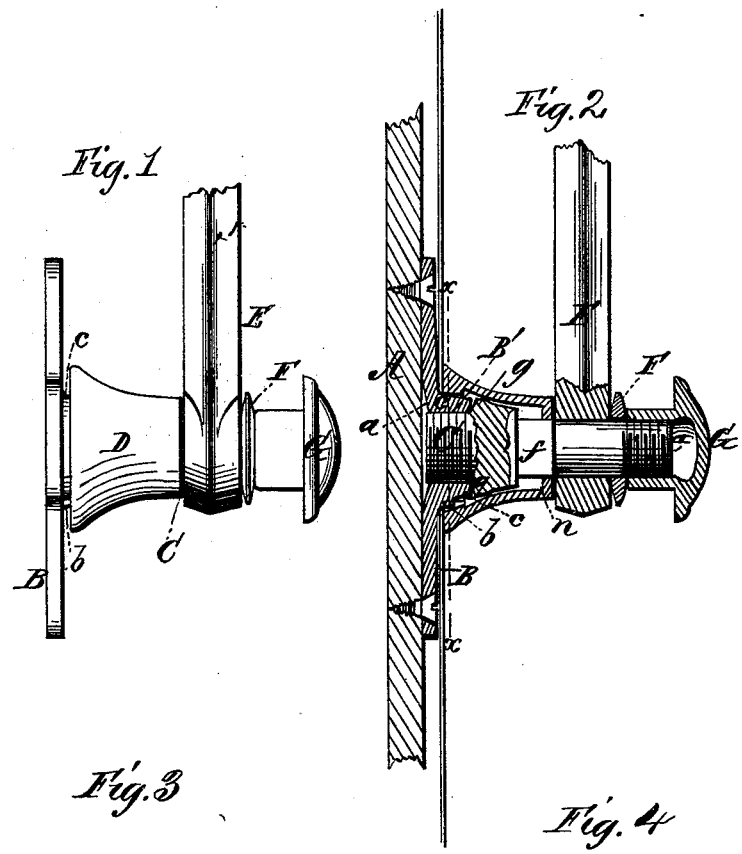

JAMES IVES, OF MOUNT CARMEL, CONNECTICUT.

IMPROVEMENT IN CARRIAGE-TOP PROPS.

Specification forming part of Letters Patent No. 186,039, dated January 9, 1877; application filed December 16, 1876.

*To all whom it may concern:*

Be it known that I, JAMES IVES, of Mount Carmel, in the county of New Haven and State of Connecticut, have invented a new and useful Improvement in Carriage-Top Props; and I do hereby declare that the following is a full, clear, and exact description thereof, reference being had to the accompanying drawings, making part of this specifiation, in which—

Figure 1 is a front elevation of my improved carriage-top prop. Fig. 2 is a vertical transverse section of the same. Fig. 3 is a vertical cross-section of the same in the line $x\ x$ of Fig. 2; and Fig. 4 is a bottom face view of the adjustable washer.

The object of my invention is, first, to prevent the screw-bolt from unscrewing, after once it is inserted to its place, by mechanical devices which permit the screw-bolt of carriage-top props to be screwed into the socket-plate to a greater or less degree whenever the covering-washer, which is between the joint end of the carriage-top and the socket-plate, is loose or becomes loose in the slightest degree; second, to prevent the motion and friction of the joint end from loosening the prop-nut in the ordinary raising and lowering of the carriage-top, which is a very common evil, and often results in the loss of the nut.

The nature of my invention consists, first, in a skirting or covering washer for the prop or screw-bolt, made with a circle of shallow scallops on its inner surface, at its base or broadest end; second, in the combination, with a screw-bolt and a screw-threaded socket-plate, of a bell-shaped washer, having a shallow flange at its outer end, which flange incloses a square opening, in which the square of the screw-bolt fits; third, in the combination of the said washer with the prop or screw-bolt made with a square on a portion of its body and a screw-thread on both its ends, and with a socket-plate which has a shallow stop for fitting into any one of the scallops of the washer, and a screw-socket for the screw-bolt or prop to screw into, as will be presently described; fourth, in a washer of lenticular form, in combination with the tightening or prop nut and the end of the carriage-top joint, by which the friction upon these two parts of a carriage-top prop is greatly reduced.

In the accompanying drawings, A is a standard of a carriage; B, a metal socket-plate, hollowed out on its under side, as at $a$, so as to be in relief at its center when it is screwed to the standard A. This socket-plate has a fixed pawl or stop, $b$, projecting out from the circumference of the collar $c$, in which the socket B' is formed. The depth of this pawl is very little, it not being equal to half the depth of the collar $c$, and it is made thus in order that the slightest outward movement of the movable parts of the prop will disengage it from the part which it is intended to hold from turning when all the parts are screwed up to a working position. C is the prop or screw-bolt, made with a screw-thread, $e$, on its outer end. This bolt also has a square formed on it at $f$, and a shoulder at $g$, and between the square portion $f$ and its screw-threaded portion $e$ it is cylindrical and smooth. The bolt C screws into the socket-plate in the manner which is common to several styles of carriage-props, and its shoulder $g$ abuts against the collar $c$ of the socket-plate, as shown. D is a skirting or bell-shaped covering-washer, placed over the screw-bolt and collar of the socket-plate B. On the base or inner end of this washer a circle of scallops, $m$, are formed so as to have but very little depth and length, and so that they are very small and close together. And at the outer end of this washer a shallow flange, $n$, projects inward and incloses a square opening. The washer, constructed as described, fits, by means of any one of its scallops, over the pawl or stop, and by means of its flange over the square part $f$ of the bolt C. And thus arranged it (the washer) prevents the bolt turning, and in turn is prevented from turning itself, the stop $b$ effecting the latter result and the square of the bolt the former result. E is the joint end or arm of the carriage-top, fitted on the round part of the bolt. F, the lenticular or swelled washer, also fitted on the round of the bolt. G is the prop or binding-nut screwed on the end of the bolt until all the parts are forced snugly against one another, as shown. The washer, it will be observed from the drawings, only impinges upon the joint end and nut near its eye or bore, and, therefore, friction outside of this point is avoided. In case it is desired to tighten up the parts of the prop, on account of wear or rattling, the nut G is turned back and the washer D moved so as to clear the stop b, and then the bolt C is screwed farther into the socket-plate, and the parts again fastened by the binding or joint nut G. By having simply knife-edge divisions between the scallops the slightest adjustment of the bolt may be made, and no difficulty will be experienced in getting the parts back to their original positions. This is not possible with other top-props, unless the bolt be removed entirely from the socket and a portion of its shoulder g turned down so as to permit the screw to be turned in its socket a quarter of a circle. And by having the washer flaring or bell-shaped, and with a shallow flange which incloses a square-opening, the washer can be made very tight and at less expense than heretofore, and still it will answer to fit firmly upon the square of the adjustable screw-bolt.

In carrying out my invention, the ratchet notches or scallops might be formed on the collar of the socket-plate, and the pawl or stop on the washer D, but I prefer the plan represented and described.

What I claim as new, and desire to secure by Letters Patent, is—

1. The covering-washer D, constructed with the separated scallops at its inner end and on its inner surface, substantially as described.

2. The covering-washer D, constructed with the flange at its outer end, which incloses the square opening in which the adjustable screw-bolt fits, substantially as described.

3. The combination of the washer D, constructed with the flange at one end and scallops at the other, the screw-bolt, the socket-plate, and the pawl or stop-pin, substantially as described.

4. The double-convex solid metal washer, in combination with the joint end, binding-nut, and prop-bolt, as described.

Witness my hand in the matter of my application for a patent for an improved carriage-top prop this 14th day of December, 1876.

JAMES IVES.

Witnesses:
W. W. WOODRUFF,
L. H. BASSETT.